T. G. LEAVELL.
MEANS FOR OPERATING STREET AND STATION ANNUNCIATORS FOR CARS.
APPLICATION FILED NOV. 22, 1910.

1,086,301.

Patented Feb. 3, 1914.

2 SHEETS—SHEET 1.

Witnesses

Inventor
Thomas G Leavell
by
Attorneys.

T. G. LEAVELL.
MEANS FOR OPERATING STREET AND STATION ANNUNCIATORS FOR CARS.
APPLICATION FILED NOV. 22, 1910.

1,086,301.

Patented Feb. 3, 1914.

2 SHEETS—SHEET 2.

Witnesses
N. Meem
L. P. Morrill

Inventor
Thomas G. Leavell
by
Mason Fenwick & Lawrence
Attorneys

UNITED STATES PATENT OFFICE.

THOMAS G. LEAVELL, OF SPOKANE, WASHINGTON.

MEANS FOR OPERATING STREET AND STATION ANNUNCIATORS FOR CARS.

1,086,301. Specification of Letters Patent. Patented Feb. 3, 1914.

Application filed November 22, 1910. Serial No. 593,745.

*To all whom it may concern:*

Be it known that I, THOMAS G. LEAVELL, citizen of the United States, residing at Spokane, in the county of Spokane and State of Washington, have invented certain new and useful Improvements in Means for Operating Street and Station Annunciators for Cars; and I do hereby declare the following to be a full, clear, and exact description of the invention, such as will enable others skilled in the art to which it appertains to make and use the same.

This invention relates to street and station annunciators for cars, and more particularly to annunciators for use on electric cars operated with an overhead trolley.

The object is to provide means for actuating the operative parts of the annunciator by the use of air from the tank supplying the air brakes.

A further object is to control the flow of air by means of a device attached to the trolley pole of the car, such device being operated in turn by a tripping member connected with one of the trolley wire supporting devices.

With these objects in view, the invention consists in the novel construction hereinafter described and claimed.

Figure 1:
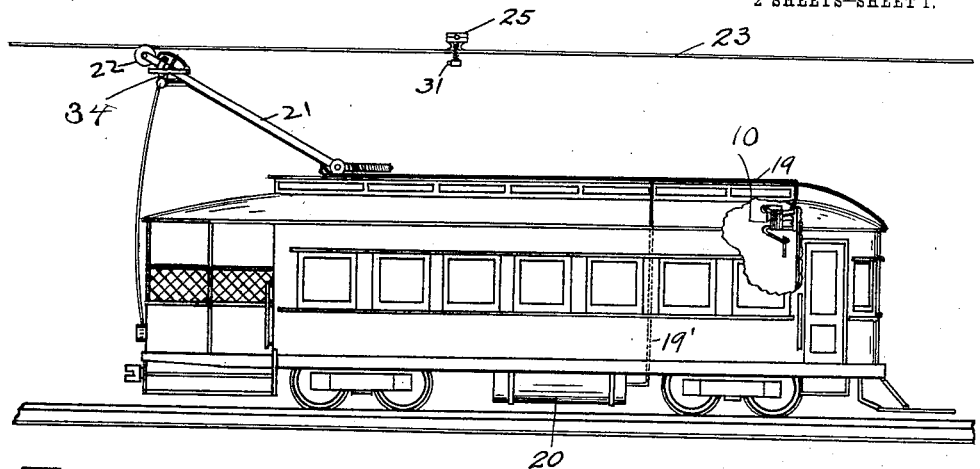
Figure 2:
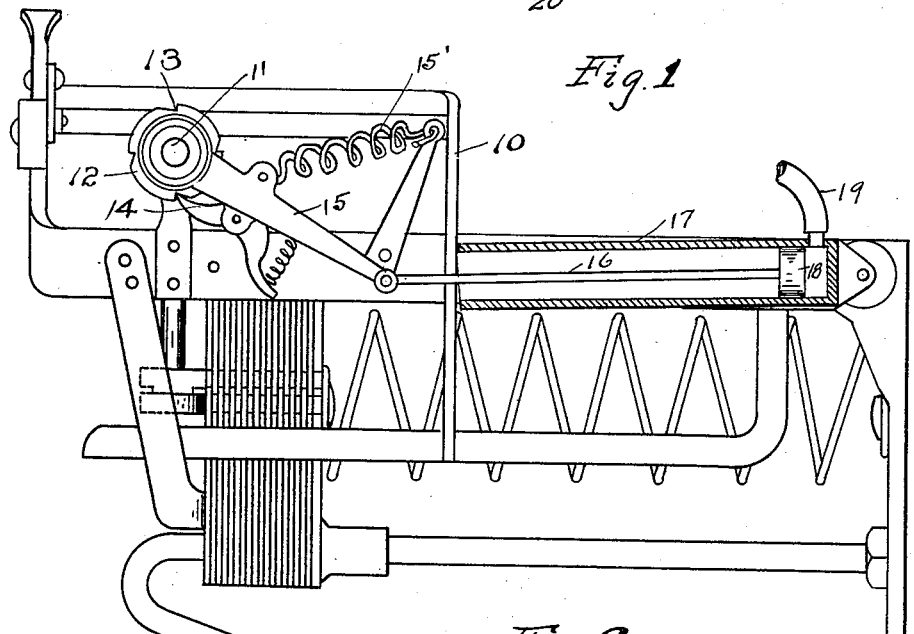
Figure 3:
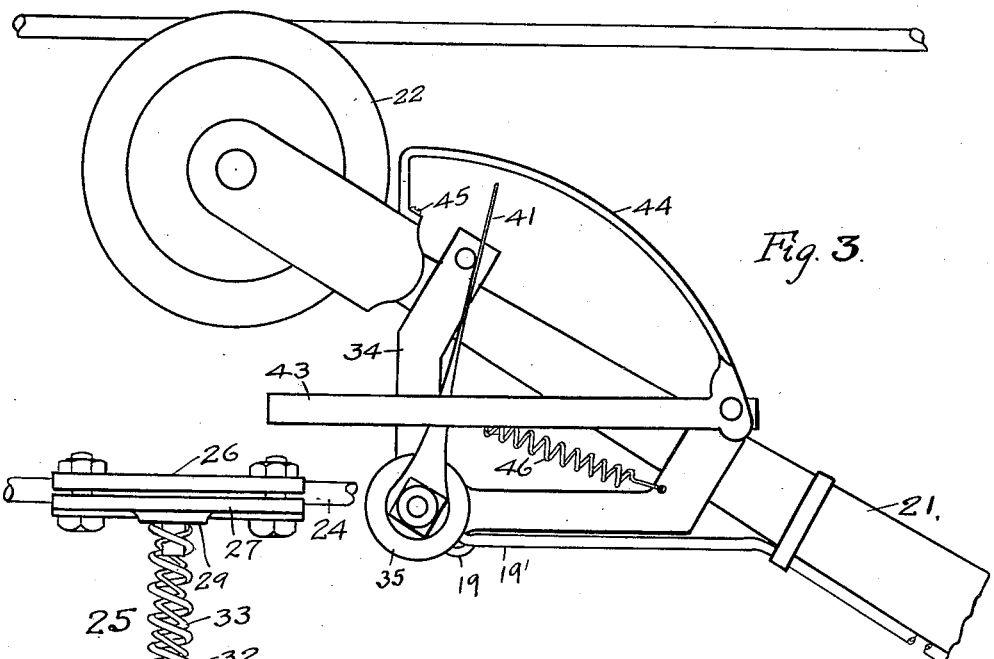
Figure 5:
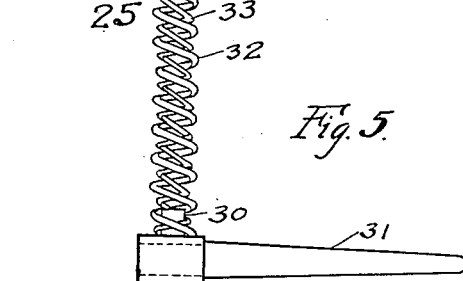
Figure 4:
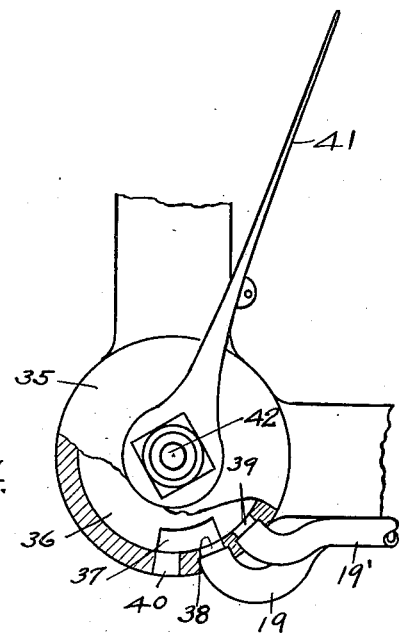

In the accompanying drawings, forming part of this application, Figure 1 is a side elevation of a car with the device applied thereto, Fig. 2 is a view partly in elevation and partly in section showing the means for directly actuating the annunciator. Fig. 3 is a side elevation of a portion of a trolley pole and trolley wheel with the means for controlling the air supply connected therewith. Fig. 4 is a detail view showing the air valve. Fig. 5 is a further detail showing the tripping device attached to the trolley wire.

In carrying out my invention I employ a device for indicating the streets or stations, such device being of any usual form, one form being shown conventionally in Fig. 2 and indicated by the numeral 10. This portion of the construction is operated in the manner described in the patent granted to me Sept. 27, 1910, No. 971,052.

A shaft 11 carries a wheel 12 provided with notches 13 on the edges thereof, such notches being engaged by a pawl 14 carried by a pivoted lever 15 mounted at one end on said shaft 11 and connected at the other end with a rod 16 which extends into air cylinder 17. Lever 15 has connected therewith a spring 15' for returning the lever to its normal position when moved by the piston rod. The cylinder 17 has a piston 18 operating therein, rod 16 serving as a piston rod, and connected with one end of the cylinder is an air pipe 19 which may be carried parallel with the roof of the car rearwardly to the valve described below. A pipe or tube 19' connects the valve with a tank 20 supplying air to the brakes.

The trolley pole 21 of ordinary construction carries a wheel 22 designed to contact with the trolley wire 23. At suitable intervals the cross wires 24 supporting the trolley wire are provided with tripping devices 25 comprising clamping members 26 and 27 secured to the cross wires 24 by means of bolts 28, one of these clamping devices carrying a projecting member 29, which has connection with the corresponding member 30 carried by a tripping finger 31. The parts 29 and 30 are connected by a plurality of spiral springs 32 and 33 arranged concentrically and designed to hold the member 31 in a suitable position and to return it to its normal position when moved out of that position by the device described below which is carried by the end of the trolley pole.

A frame 34 is clamped on the end of the pole 21 by means of bolts or rivets, this frame constituting substantially a V-shaped member with the outer ends of the arms bent parallel and having an enlarged member 35 at the point of juncture of the arms, said member 35 comprising a casing for the valve designed to control the supply of air to cylinder 17.

Within casing 35 a disk like valve member 36 is mounted, such member 36 being provided with a cutaway portion 37. The pipe or tube 19 is connected with valve casing 36 at the point 38, and at 39 pipe 19' leading from the air tank is connected.

A third opening 40 is provided in the casing 35 and cutaway portion 37 is of such size that it will register at a given time with openings 38 and 40 or 38 and 39 as may be required. Opening 40 constitutes an exhaust and when said opening is connected with opening 38 air is permitted to flow from pipe 19 for exhausting cylinder 17. On the other hand if cutaway portion 37 is connected with openings 38 and 39 air may pass from the compressed air tank through pipe 19' cutaway portion 37 and pipe 19 to cylinder 17 for the purpose of operating the piston therein.

An arm 41 is carried on the end of valve stem 42 and rotates the valve member 36 when the arm 41 is moved by tripping member 31 above described. Arm 41 is protected by a guard member comprising a substantially horizontal portion 43 and the curved member 44, which is connected to the trolley head at 45. A spring 46 is secured to the frame 34 and to arm 41. Tripping member 31 first strikes member 44, placing the springs slightly under tension, and on the recoil, member 31 strikes arm 41.

What I claim is:

In a device of the class described, an annunciator, means for operating the same, and means for controlling the operating means, said controlling means including a device arranged to be carried by a trolley pole, a spring held arm comprising one member thereof, and means arranged to be carried by a trolley wire for tripping the arm, said means last mentioned including a plurality of coiled springs concentrically mounted, one of said springs serving to stiffen the other and providing therewith a support for the tripping member having a limited degree of resiliency.

In testimony whereof I affix my signature in presence of two witnesses.

THOMAS G. LEAVELL.

Witnesses:
E. A. BLOMGREN,
C. E. SHOEMAKER.

---

Copies of this patent may be obtained for five cents each, by addressing the "Commissioner of Patents, Washington, D. C."